3,583,986
ORGANIC ACID ADDITION SALT OF ALKANOL-
SUBSTITUTED S-TRIAZINES
Werner Heimberger, Hanau am Main, Germany, assignor to Deutsche Gold- und Silber-Scheideanstalt vormals Roessler, Frankfurt am Main, Germany
No Drawing. Continuation-in-part of application Ser. No. 594,647, Oct. 31, 1966. This application Feb. 9, 1968, Ser. No. 704,237
Claims priority, application Germany, Feb. 17, 1967, D 52,315
Int. Cl. C07d 55/18, 55/20
U.S. Cl. 260—249.9
3 Claims

ABSTRACT OF THE DISCLOSURE

Novel alkanol substituted s-triazines of the formula

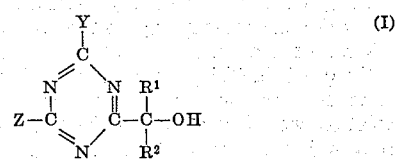
(I)

wherein $R^1$ and $R^2$ can be the same or different and are selected from the group consisting of hydrogen, alkyl of 1–6 carbon atoms and hydroxy alkyl of 1–6 carbon atoms; Y is selected from the group consisting of —$CH_3$, —$CH_2Hal$, —$CHHal_2$, —$CHal_3$, Hal, —OR, SR and

wherein Hal is a halogen atom, preferably chlorine, R is selected from the group consisting of hydrogen, alkyl of 1–6 carbon atoms and alkyl of 1–6 carbon atoms substituted by —OH, —$OR^5$, —$NHR^5$, —$N(R^6)_2$ or a halogen atom, $R^3$ and $R^4$ and have the same significance as $R^1$ and $R^2$ and furthermore may be closed to a ring, possibly with the inclusion of a further heteroatom, such as a piperazine, piperidine, phenoxazine, 9,10-dihydrophenazine or preferably morpholine ring and $R^5$ is selected from the group consisting of aryl such as phenyl and alkyl of 1–6 carbon atoms, $R^6$ taken individually are aryl or alkyl of 1 to 6 carbon atoms and taken together can be closed to a ring with the nitrogen atom, possibly with inclusion of a further heteroatom, as described above with reference to $R^3$ and $R^4$, and Z is

wherein $R^3$ and $R^4$ have the same significance as above, Y preferably being —$CH_3$, —$CH_2Cl$, —$CHCl_2$ or particularly —$CCl_3$ or also Z, as well as their pharmacologically acceptable acid addition salts.

The compounds possess biological activity such as an analgesic activity and especially an antiphlogistic or anti-inflammatory activity.

RELATED APPLICATION

This application is a continuation-in-part of application Ser. No. 594,647, filed Oct. 31, 1966.

GENERAL DESCRIPTION OF THE INVENTION INCLUDING PREFERRED EMBODIMENTS THEREOF

The new compounds according to the invention described above can be prepared by saponifying compounds of the formula

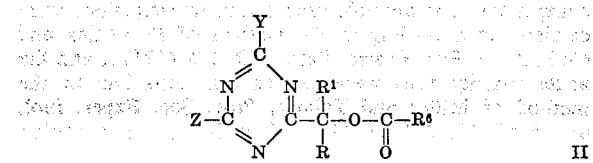
II wherein $R^6$ is alkyl or hydroxy alkyl of 1–6 carbon atoms or aryl or hydroxy aryl, in the presence of a water miscible organic solvent, especially a lower alkanol, and preferably methanol, and in the presence of about molar quantities of barium hydroxide or sodium hydroxide, potassium hydroxide at a temperature between 0° C. and the boiling point of the solvent, preferably between about 50 and 70° C. to form a compound of Formula I. In the event that Y initially represents the group —$CHal_3$, the compound can be reacted with an amine of the formula

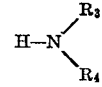

wherein $R^3$ and $R^4$ have the same significance as above to form compounds wherein Y is

The latter reaction can, for example, be carried out in the presence of an alkali metal alcoholate, preferably in quantities of 0.1 to about 10 wt. percent at room or raised temperatures. In order to facilitate the reaction it is expedient to use a lower alkanol as solvent. It, however, also is possible to use a sufficient quantity of the amine

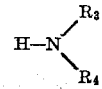

that the starting triazine dissolves therein. The ratios of the compounds used, for example, can be between 1:5 and 1:10. If the amine is a solid substance, it can first be dissolved in a small quantity of an organic solvent, such as, for example, acetone, ethyl acetate, dioxane or alkanols. If desired, the reaction can also be carried out in the presence of catalytic quantities of water or alkali metal hydroxide. The reaction can be carried out at room temperature.

The compounds used as starting materials, for example, can be prepared by the process described in German Pat. 1,189,999.

The salts of the compounds which also possess a strong analgesic and anti-inflammatory activity can be prepared with the acids commonly used in making pharmacologically acceptable salts, such as, for example, sulfuric, phosphoric, hydrochloric, hydrobromic, hydriodic, sulfamic, benzyl sulfonic, p-toluene sulfonic, camphor sulfonic, methane sulfonic, quazulonic sulfonic, maleic, fumaric, succinic, tartaric, lactic, citric, ascorbic, glycolic, salicylic and the like acids.

The compounds according to the invention and their salts, for example, provide a strong anti-inflammatory action or antiphlogistic action on carrageen edema of the rat's paw upon oral administration in dosages of 10–100 mg./kg.

The following table indicates the arrest in carrageen edema of the rat's paw upon oral administration of 30 mg./kg. of several illustrative compounds according to the invention (results in percent of edema arrest as compared to control group) and the acute toxicity of such compounds. The antiphlogistic action investigations were carried out according to the method of Domenjoz and Coll., Arch. Exp. Pharm. Path. 230, 325 (1957), and the acute toxicity tests were carried out according to the method of Miller and Tainter, Proc. Soc. Exper. Biol. and Med. 57, 261 (1944) with a 24 hour observation period.

TABLE

| | Arrest in carrageen edema at 30 mg./kg. dosage, oral (rat) percent | $LD_{50}$ mg./kg. (rat) oral |
|---|---|---|
| D 9220 | 57 | ca. 2,000 |
| D 9721 | 50 | ca. 1,000 |
| D 9722 | 52 | ca. 1,000 |

D 9220 = 2-trichloromethyl-4-(1-methyl - 1 - hydroxyl)-ethyl-6-morpholino-s-triazine
D 9721 = 2-ethylamino-4-(1-methyl-1-hydroxyl)-ethyl - 6-piperazino-s-triazine
D 9722 = 2-ethylamino-4-(1-methyl-1-hydroxy)-ethyl - 6-piperazino-hydrochlorides-s-triazine The compounds according to the invention have good anti-inflammatory activity and the indications as anti-inflammatory agents are as follows:

Chronic arthritis
Illnesses of rheumatic nature
Post-traumatic inflammations
Swellings on fractures
Thrombophlebitis in every form (including post-operative)
Bursitis
Synovitis
Collagenoses (polymyositis, periarthritis)
Gout
Intraperitoneal adhesions The novel compounds according to the invention can be used, if desired, also in combination with other medicaments, in the form of pharmaceutical compositions suited for enteral and parenteral application.

The enteral administration can, for instance, be effected in the form of tablets, capsules, pills, dragées, suppositories, oily and aqueous solutions or suspensions and emulsions. The parenteral administration can be effected in the form of injectable oily and aqueous solutions or suspensions and emulsions.

The dosage depending upon form of administration can be between 0.1 and 500 mg. one or more times a day.

The following examples will serve to illustrate the compounds according to the invention.

EXAMPLE 1

50 g. of 2-trichloromethyl-4-morpholino-6-[α - (carbethoxy)-α-methyl-α-oxyethyl]-s-triazine were dissolved in 300 ml. of methanol and the solution heated to boiling. 42 g. of $Ba(OH)_2 \cdot 8H_2O$ were dissolved in 400 ml. of hot methanol and such solution added to the triazine solution over a 3 hour period while the latter was constantly boiled. The triazine solution which initially was clear became cloudy as the saponification proceeded upon addition of the $Ba(OH)_2$ solution. The reaction mixture was then boiled down without first separating the solids and the residue stirred up with dilute HCl whereupon $CO_2$ was set free. The water insoluble portion was taken up in methylene chloride. After such solution had been washed neutral it was boiled down without first separating the solids and the residue stirred up with dilute HCl whereupon $CO_2$ was set free. The water insoluble portion was taken up in methylene chloride. After such solution had been washed neutral it was boiled down. The residue was triturated with water whereupon it crystallized. The yield of 2-trichloromethyl-4-morpholino - 6 - [α - hydroxyethyl - α-methyl]-s-triazine was 18 g. or 43.5% of theory. Its melting point was 72–82° C.

EXAMPLE 2

85 g. of 2-trichloromethyl-4-ethylamino-6-[α - (carbethoxy)-α-methyl-oxyethyl]-s-triazine were dissolved in 300 ml. of methanol and heated to boiling.

72 g. of $Ba(OH)_2$ were dissolved in 400 ml. of hot methanol and the non-dissolved $BaCO_3$ filtered off. This solution was then added to the boiling triazine solution over a 3 hour period. The processing thereafter was as in Example 1. 51 g. or a yield 75% of theory was obtained as the crystalline residue. When recrystallized from ligroin the 2-trichloromethyl-4-ethylamino-6-α-methyl-α-hydroxyethyl-s-triazine of a M.P. of 80–82° C. was obtained.

EXAMPLE 3

100 g. of α-(carbethoxy)-α-methyl-α-oxyethyl-4-ethanolamino-6-trichloromethyl-s-triazine were dissolved in 180 ml. of methanol. Then a solution of 93 g. of

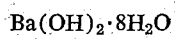
$Ba(OH)_2 \cdot 8H_2O$ in 700 ml. of methanol were added thereto and the mixture heated to reflux with stirring for 1½ hours. The reaction solution was then adjusted to a pH of 5 with concentrated HCl whereby $CO_2$ was liberated and the solution concentrated under vacuum. The residue was stirred up with water whereby 46.8 g. of pure 2-(α-hydroxy)-ethyl-α-methyl-4-ethanolamino-6-trichloromethyl-s-triazine with 1 mol of $H_2O$ were obtained. Yield: 52% of theory; M.P. 69–74° C.

EXAMPLE 4

114 g. of α-(carbomethoxy-α-methyl)-α-oxyethyl - 4-morpholino-6-trichloromethyl-s-triazine (M.P. 90–95° C.) were dissolved in 500 ml. of methanol and a solution of 90 g. of $Ba(OH)_2 \cdot 8H_2O$ in 750 ml. of methanol added thereto over a 30 minute period. The mixture was then refluxed for 1½ hours. The processing was as described in Example 3.

Yield: 51 g. of 2-(α-hydroxy)-ethyl-α-methyl-4-morpholino-6-trichloromethyl-s-triazine.

EXAMPLE 5

Analogously the following compounds:

(a) 2-(α-hydroxy-α-methyl)-ethyl-4-(3 - methoxypropyl)-amino-6-trichloromethyl-s-triazine (M.P. 41–43° C.)
(b) 2-(α-hydroxy-α-methyl-ethyl)-4-piperidino - 6 - trichloromethyl-s-triazine (M.P. 82–87° C.)
(c) 2-(α-hydroxy-α-methyl-ethyl)-4-(2 - hydroxypropyl)-amino-6-trichloromethyl-s-triazine (syrup)

were respectively obtained from (a) 2-α-(carbomethoxy-α-methyl)-α-oxyethyl - 4 - (3)-methoxy-propylamino-6-trichloromethyl-s-triazine
(b) 2-α-(carbomethoxy-α-methyl)-α-oxyethyl-4 - piperidino-6-trichloromethyl-s-triazine
(c) 2-α-(carbomethoxy-α-methyl)-α-oxyethyl-4-(2) - hydroxy-propylamino-6-trichloromethyl-s-triazine.

EXAMPLE 6

77.5 g. of 2-α-cargomethoxy-α-methyl-α-oxyethyl-4-(3-hydroxy)-propylamino-6-trichloromethyl-s-triazine were heated with 145 ml. of thionyl chloride to produce 2-α-carbomethoxy-α-methyl-α-oxyethyl-6-trichloromethyl - s-triazine, which was not isolated, but processed in the usual manner as a crude product, which was dissolved in 100 ml. of methanol and heated under reflux for 90 minutes with 63 g. of Ba(OH)$_2$·8H$_2$O dissolved in 530 ml. of methanol. After processing as described above, 34 g. or 54% of theory of 2-α-hydroxy-α-methyl-ethyl-4 - (3)-chloropropylamino-6-trichloromethyl-s-triazine of a M.P. of 68–71° C. were obtained.

EXAMPLE 7

41.25 g. of α-carbethoxy-α-methyl-α-oxyethyl-4-piperazino-6-trichloromethyl-s-triazine (0.1 mol) were heated to reflux with 161.6 g. (1.8 mol) 50% aqueous ethylamine for 4 hours.

The reaction solution was then concentrated under vacuum and the residue dissolved in 200 ml. of methylene chloride. The solution was washed with water to extract the residue of ethylamine. Then the solution was concentrated under vacuum. The residue yielded 22.3 g. of 2-(α-carboxy-α-methyl)-oxyethyl - 4 - piperazino - 6 - ethylamino-s-triazine which was 66% of theory.

EXAMPLE 8

33.8 g. of 2-α-carbethoxy-α-methyl-α-oxyethyl-4-piperazino-6-ethylamino-s-triazine (0.1 mol) were dissolved in 500 ml. of methanol and then a solution of 10 g. of sodium hydroxide in 50 ml. of water was added. After keeping at room temperature for two days the solid Na$_2$CO$_3$ formed was separated and the solution concentrated under vacuum. The residue was dissolved with 200 ml. of ethyl acetate and after washing with water the solution was boiled down.

The residue yielded 20.75 g. of 2-α-methyl-α-hydroxy-ethyl-4-piperazino-6-ethylamino-s-triazine which was 78% of theory. Its melting point was 88–92° C.

EXAMPLE 9

26.6 g. of 2-α-hydroxyethyl-α-methyl-4-piperazino-6-ethylamino-s-triazine (0.1 mol) were dissolved in 200 ml. of ethyl acetate and 3.65 g. of gaseous HCl (0.1 mol) were introduced. The formed solids of hydrogen chloride of the triazine compound were separated and washed with ethyl acetate and thereafter dried.

The yield of 2-α-hydroxyethyl-α-methyl-4-piperazino-6-ethylamino-s-triazine-hydrogen chloride was 25.6 g. or 84.6% of theory. Its melting point under decomposition was 281–285° C.

EXAMPLE 10

(a) 36.2 g. of 2-(α-carbethoxy-α-methoxy)-oxyethyl-4-N'-methyl-piperazino - 6 - ethylamino-s-triazine (0.1 mol, viscous, produced after Example 7 from 2-(α-carbethoxy-α-methyl)-oxyethyl-4-N'-methyl-piperazino - 6 - trichloromethyl-s-triazine, melting point 95–98° C.) were dissolved in 500 ml. of methanol and refluxed with 31.5 g. of Ba(OH)$_2$·8H$_2$O (0.1 mol) for two hours. After cooling down 7.3 g. of gaseous HCl (0.2 mol) were added whereupon CO$_2$ was set free. The solution was concentrated and the residue heated with 200 ml. of ethanol for two hours whereupon the saponified triazine compound was dissolved. The solid BaCl$_4$ was separated and the solution concentrated under vacuum. The residue was washed with water and dried.

The yield of 2-α-hydroxyethyl-α-methyl-4-N'-methyl-piperazino-6-ethylamino-s-triazine was 20.1 g. (95%) or 71.8% of theory. Its melting point was 95–99° C.

(b) 28 g. (0.1 mol) of the compound prepared as above under (a) were dissolved in 150 ml. of methanol and added to a solution of 11.6 g. (0.1 mol) of maleic acid in 150 ml. of methanol.

The solution was allowed to stand overnight at room temperature, whereby the maleic acid addition salt crystallized out. It was filtered off, washed with a small quantity of cold methanol. The mother liquor was concentrated to one-half its volume and upon cooling a further quantity of the salt crystallized out. After filtering off, washing and drying, a total of 29.7 g. of 2-α-hydroxyethyl-α-methyl-4-N'-methyl-piperazino-6-ethylamino-s-triazine maleate of a melting point of 121–124° C. were obtained. The yield was 75.2% of theory.

EXAMPLE 11

(a) 34.2 g. (0.1 mol) of 2-trichloromethyl-4-(α-acetoxy-α-methyl)-ethyl - 6 - ethylamino-s-triazine were introduced into a solution of 9.2 g. (0.4 mol) of Na in 200 ml. of methanol and the mixture heated under reflux for 2 hours. After cooling down the pH of the solution was adjusted to 6 with aqueous HCl and the methanol distilled off under vacuum. The crystalline residue was washed with water and dried. 19 g. of 2-methoxy-4-(α-methyl - α - hydroxy)-ethyl - 6 - ethylamino-s-triazine of a melting point of 58–61° C. were obtained. The yield was 75% of theory.

(b) 40.0 g. (0.1 mol) of 2-trichloromethyl-4-(α-methoxy-carbonyloxy-α-methyl)-ethyl - 6-N'-morpholino-s-triazine were reacted in an analogous manner to obtain 18.4 g. of 2-methoxy - 4 - (α-methyl-α-hydroxy)-ethyl-6-morpholino-s-triazine of a melting point of 132–134° C. The yield was 72.5% of theory.

(c) 41.2 g. (0.1 mol) of 2-trichloromethyl-4-(α-methoxy-carbonyloxy - α - methyl) - ethyl - 6 - N'-methyl-piperazino-s-triazine were reacted in an analogous manner. However, when the methanol was distilled off a syrupy residue was obtained which was taken up in methylene chloride and washed with water. The methylene chloride was then distilled off and the residue extracted with hexane whereby the impurities were left in the residue. When the hexane solution was boiled down a syrupy residue remained which crystallized upon standing. 16 g. of 2-methoxy-4-(α-methyl-α-hydroxy)-ethyl - 6 - N'-methyl-piperazino-s-triazine with a melting point of 57–63° C. were obtained. The yield was 60% of theory.

EXAMPLE 12

35.8 g. (0.1 mol) of 2-trichloromethyl-4-(α-methoxy-carbonyl-α-methyl) - ethyl - 6 - ethylamino-s-triazine were heated under reflux in a mixture of 100 ml. of methanol and 150 ml. of 2 N NaOH for 3 hours. After cooling the pH of the mixture was adjusted to 3 with conc. HCl. After standing overnight the crystalline product was filtered off, washed and dried. 15.5 g. of 2-hydroxy-4-(α-methyl-α-hydroxy)-ethyl-6-ethylamino-s-triazine of a melting point of 235–238° C. were obtained. The yield was 78.3% of theory.

EXAMPLE 13

40.0 g. (0.1 mol) of 2-trichloromethyl-4-(α-methoxy-carbonyloxy - α - methyl)-ethyl - 6 - morpholino-s-triazine were introduced portionwise into a solution of 9.2 g. (0.4 mol of Na in 300 ml. of isopropanol at 70° C. over a period of 30 minutes and the mixture then heated under reflux for a further 30 minutes. The isopropanol was then distilled off under vacuum and the residue taken up in methylene chloride and washed with water. After boiling down a syrupy residue was obtained which crystallized on standing. The crystalline mass was stirred up with a little hexane and after drying 18.5 g. of 2-isopropoxy-4-(α-methyl-α-hydroxy) - ethyl - 6 - morpholino-s-triazine of a melting point of 55–59° C. were obtained. The yield was 65.6% of theory.

EXAMPLE 14

40.0 g. (0.1 mol) of 2-trichloromethyl-4-(α-methoxycarbonyloxy - α - methyl)-ethyl - 6 - morpholino-s-triazine were added portionwise into a solution of 9.2 g. (0.4 mol) of Na in 150 ml. of ethanol amine at 50° C. and then stirred for a further 30 minutes at this temperature. The excess ethanol amine was distilled off under vacuum and the residue taken up in methylene chloride and washed with water. The reaction product was then extracted from the methylene chloride solution with 50 ml. of 2 N acetic acid and the extract adjusted to a pH of 10 with NaOH whereby the triazine compound crystallized out. 17 g. of 2-β-aminoethoxy - 4 - (α-methyl-α-hydroxy)-ethyl-6-morpholino-s-triazine of a melting point of 131–137° C. were obtained. The yield was 60% of theory.

The following table gives the formulae of the starting materials and products of the examples. For sake of simplicity the triazine ring

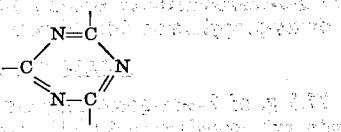

will be represented therein by the symbol

| Example | Starting material | End product |
|---------|-------------------|-------------|
| 1 | Cl₃C—◁ with C(CH₃)₂OCOOC₂H₅ and morpholino (N H O) | Cl₃C—◁ with C(CH₃)₂—OH and morpholino (N H O) |
| 2 | Cl₃C—◁ with C(CH₃)₂OCOOC₂H₅ and NHC₂H₅ | Cl₃C—◁ with C(CH₃)₂OH and NHC₂H₅ |
| 3 | Cl₃C—◁ with C(CH₃)₂OCOOC₂H₅ and NHCH₂—CH₂OH | Cl₃C—◁ with C(CH₃)₂OH and NHCH₂—CH₂OH |
| 4 | Cl₃C—◁ with C(CH₃)₂OCOCH₃ and morpholino (N H O) | Cl₃C—◁ with C(CH₃)₂OH and morpholino (N H O) |
| 5a | Cl₃C—◁ with C(CH₃)₂OCOCH₃ and NHCH₂—CH₂—CH₂OCH₃ | Cl₃C—◁ with C(CH₃)₂OH and NHCH₂—CH₂—CH₂—OCH₃ |
| 5b | Cl₃C—◁ with C(CH₃)₂OCOCH₃ and piperidino (N H) | Cl₃C—◁ with C(CH₃)₂OH and piperidino (N H) |
| 5c | Cl₃C—◁ with C(CH₃)₂OCOCH₃ and NHCH₂—CH(OH)CH₃ | Cl₃C—◁ with C(CH₃)₂OH and NHCH₂—CH(OH)CH₃ |
| 6 | Cl₃C—◁ with C(CH₃)₂OC—OCH₃ and NHCH₂—CH₂—CH₂—OH | Cl₃C—◁ with C(CH₃)₂OH and NHCH₂—CH₂—CH₂Cl |
| 7 | Cl₃C—◁ with C(CH₃)₂OCOOC₂H₅ and (N H NH) | H₅C₂HN—◁ with C(CH₃)₂OCOOC₂H₅ and (N H NH) |

TABLE—Continued

| Example | Starting material | End product |
|---|---|---|
| 8 | | |
| 9 | | |
| 10a | | |
| 11a | | |
| 11b | | |
| 11c | | |
| 12 | | |
| 13 | | |
| 14 | | |

I claim:
1. An acid addition salt between a pharmaceutically acceptable organic acid and an alkanol-substituted s-triazine of the formula

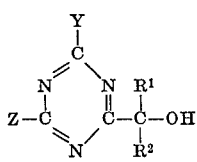

wherein each of $R^1$ and $R^2$ are selected from the group consisting of hydrogen, lower alkyl of 1 to 6 carbon atoms and lower hydroxy alkyl of 1 to 6 carbon atoms, Y is selected from the group consisting of —$CH_3$, $CH_2Hal$, —$CHHal_2$, —$CHal_3$, —Hal, —OR, —SR and

wherein R is selected from the group consisting of hydrogen, lower alkyl of 1 to 6 carbon atoms and lower alkyl of 1 to 6 carbon atoms substituted with a substituent selected from the group consisting of —OH, —$OR^5$, —$NHR^5$, —$N(R^6)_2$ and Hal, Hal signifies a halogen atom, $R^3$ and $R^4$ have the same meaning as R and may be the same or different with the proviso that only one of these two radicals shall be said substituted alkyl and wherein $R^3$ and $R^4$ together may form piperazino, N'-methylpiperazino or piperidino, $R^5$ is selected from the group consisting of phenyl and lower alkyl of 1 to 6 carbon atoms, $R^6$ is selected from the group consisting of phenyl and lower alkyl of 1 to 6 carbon atoms, and Z is selected from the group consisting of

wherein $R^3$ and $R^4$ have the same significance as above.

2. The maleate of an alkanol-substituted s-triazine as defined in claim 1.

3. 2-(α-hydroxy-α-methyl)ethyl - 4 - N'-methylpiperazino-6-ethylamino-s-triazine maleate.

References Cited

UNITED STATES PATENTS 2,491,658   12/1949   Gresham   260—249.9
2,937,172   5/1960   Shapiro et al.   260—249.9

JOHN M. FORD, Primary Examiner

U.S. Cl. X.R.

260—249.5; 424—249